(12) United States Patent
van den Berg

(10) Patent No.: US 6,508,109 B2
(45) Date of Patent: Jan. 21, 2003

(54) METHOD AND DEVICE FOR MEASUREMENT OF PULSATING MILK FLOW

(75) Inventor: Karel van den Berg, Bleskensgraaf (NL)

(73) Assignee: Lely Research Holdings, A.G., Zug (CH)

( * ) Notice: Subject to any disclaimer, the term of this patent is extended or adjusted under 35 U.S.C. 154(b) by 0 days.

(21) Appl. No.: 09/881,809

(22) Filed: Jun. 18, 2001

(65) Prior Publication Data

US 2001/0039838 A1 Nov. 15, 2001

Related U.S. Application Data

(63) Continuation of application No. PCT/NL00/00620, filed on Sep. 4, 2000.

(30) Foreign Application Priority Data

Oct. 18, 1999 (NL) .............................................. 1013316

(51) Int. Cl.[7] .............................. G01F 1/72; G01F 1/00; G01N 1/20
(52) U.S. Cl. ...................... 73/64.56; 73/53.01; 73/1.03; 73/223; 73/861.27; 73/61.48; 73/61.49; 73/863.43; 73/863.35; 356/410; 250/573; 324/693
(58) Field of Search ............................. 73/64.56, 53.01, 73/19.06, 23.41, 61.55, 863.43, 863.03, 863.35, 861.27, 61.48, 61.49, 223, 1.03; 356/410; 250/573, 356.1; 324/693

(56) References Cited

U.S. PATENT DOCUMENTS

| | | | | | |
|---|---|---|---|---|---|
| 3,373,600 A | * | 3/1968 | Taplin | ............................ | 73/32 |
| 3,985,021 A | * | 10/1976 | Achener et al. | ......... | 73/61.1 C |
| 4,095,472 A | * | 6/1978 | Mowery, Jr. | ............ | 73/422 GC |
| 4,121,907 A | * | 10/1978 | Roque | ......................... | 356/246 |
| 4,162,630 A | * | 7/1979 | Johnson | ..................... | 73/194 A |
| 4,887,473 A | * | 12/1989 | Proni et al. | .............. | 73/864.35 |
| 5,256,573 A | * | 10/1993 | Kuroda et al. | .............. | 436/179 |
| 5,277,074 A | * | 1/1994 | Poole et al. | ............. | 73/864.62 |
| 5,450,743 A | * | 9/1995 | Buote | ........................ | 73/61.56 |
| 5,760,299 A | * | 6/1998 | Johnson et al. | ............ | 73/61.56 |
| 6,073,498 A | * | 6/2000 | Taylor et al. | ............ | 73/864.35 |

* cited by examiner

Primary Examiner—Hezron Williams
Assistant Examiner—David J. Wiggins
(74) Attorney, Agent, or Firm—Penrose Lucas Albright

(57) ABSTRACT

A method and device for making measurements of the characteristics of a fluid, particularly the milk, which flows in pulsations in a conduit. The device has a measuring region wherein at least one characteristic of the fluid is determined. The measurement is made during an optimal measuring window which constitutes a time interval while a pulsation of the fluid is received in the measuring region which contains a sensor or sensors for measuring one or more selected characteristics of the fluid, such as color, conductivity or acoustic qualities. The measuring region may be in a bypass passageway in the conduit which may be incorporated in a teat cup. The pulsations in the teat cup may be used to define an optimal measuring window for measuring one or more characteristics of the fluid as it flows in pulsations through the conduit. The sensed entry or approach of a pulsation into the measuring region may also be used to define the optimal measuring window.

24 Claims, 2 Drawing Sheets

METHOD AND DEVICE FOR MEASUREMENT OF PULSATING MILK FLOW

RELATED APPLICATION

This Application is a continuation of International Application No. PCT/NL00/00620, filed Sep. 4, 2000.

FIELD OF THE INVENTION

The invention relates to a method of carrying out, in a conduit, measurements on a fluid medium flowing—in particular in a pulsating current—through said conduit, the conduit comprising a measuring region in which at least one parameter of the medium is determined during the measurement.

BACKGROUND OF THE INVENTION

In a known method, measured values of the relevant parameter are continuously collected. Especially when the fluid does not move through the conduit in a continuous flow, it is possible that certain parameter values are not representative. For the purpose of separating non-usable measured values from usable measured values, various filter techniques are applied. It has been found that filtering these measurement data is time-consuming and does not always produce the desired effect.

Therefore, a need exists to obviate the above-mentioned drawback or to minimize same.

SUMMARY OF THE INVENTION

In accordance with the invention, this is achieved in defining an optimal window for measuring the parameter involved whereby the data provided from the measuring window are recorded or used for a further process or both. In this manner only the usable measurement data, i.e., those measurement data having a high reliability, are recorded or used or both as a parameter in a further process.

According to an inventive feature, for the purpose of defining the measuring window, determinations are made as to when a first pulse flow has passed the measuring region and when a next pulse flow will enter the measuring region. The method has the advantage that, during measuring, the measuring region is not affected by the flowing medium. In a preferred embodiment of the invention, the measuring window is defined by the moment when, just before a new pulse flow enters the measuring region, the momentary measurement data of the relevant parameter are recorded or supplied, or both, as a control signal for a further process. The latter method has the advantage that at the moment of measuring, the medium in the measuring region has had its longest period of rest. In the case that the medium is, for example, constituted by milk which is obtained by means of a milking installation, air bubbles that enter the milk during milking have the opportunity to escape from the milk, so that measurement is not affected by these air bubbles.

In accordance with another method of the invention, it is also possible to define the measuring window at the moment when the largest possible amount of the medium is present in the measuring region. By the largest possible amount of the medium is meant that the volume of the medium is largest in the measuring region. According to a further inventive feature, the measuring window is defined by determination of the conductivity of the medium. By means of a conductivity measurement it is possible to ascertain whether the medium is present in a certain region of the line and it is also possible to determine the volume of the medium in said region. Besides a conductivity measurement, according to another inventive feature, the measuring window can also be defined by optical or acoustic detection. This method of detecting the medium is especially suitable when the medium flows through the conduit in a pulsating current. In the case that a medium flows through the line in a pulsating current, according to the invention, it is also possible to define the measuring window on the basis of signals that are supplied by means which generate the pulsating current. Such a signal comprises in particular the frequency of the pulsating current.

The invention also relates to a device for carrying out measurements on a flowing medium, in particular a medium which is flowing in a pulsating current, as described above. According to an inventive feature, first measuring means are disposed in the conduit of said device for determining the flowing medium as well as second measuring means with the aid of which at least one parameter of the medium is determined. According to again another aspect of the invention, the first measuring means comprises an optical or an acoustic or a conductivity sensor, or any combination thereof. According to a further inventive feature, it is possible that the first measuring means is constituted by a device by means of which the pulsating current of the medium is generated. In the case of a milk line system with a teat cup, the second measuring means is constituted by a pulsator.

According to a further aspect of the invention, the second measuring means comprise a color sensor by means of which the colors of the medium are determined. Thus, in the case of a milking installation, it is possible to ascertain with a high degree of reliability whether the milk contains impurities, such as, for example, blood or pus. According to a further embodiment of the invention, the measuring region is situated in a bypass of the line through which the medium flows. Thereby the bypass is connected to the main line in such a manner that the medium comes to a rest more or less in the bypass. According to another inventive feature, the diameter of the bypass is smaller than that of the line through which the medium flows. According to a further aspect of the invention, in or near the bypass an air inlet means is disposed with the aid of which air or another gas, or both, is permitted to enter or injected into the bypass, or both, processes are involved. In this manner replacement of the medium in the bypass is stimulated.

According to an inventive feature, the first and second measuring means are disposed in a milk line system or in a teat cup.

BRIEF DESCRIPTION OF THE DRAWINGS

The invention will now be explained in further detail with reference to the accompanying drawing, in which.

DETAILED DESCRIPTION OF THE PREFERRED EMBODIMENTS

Figure 1:
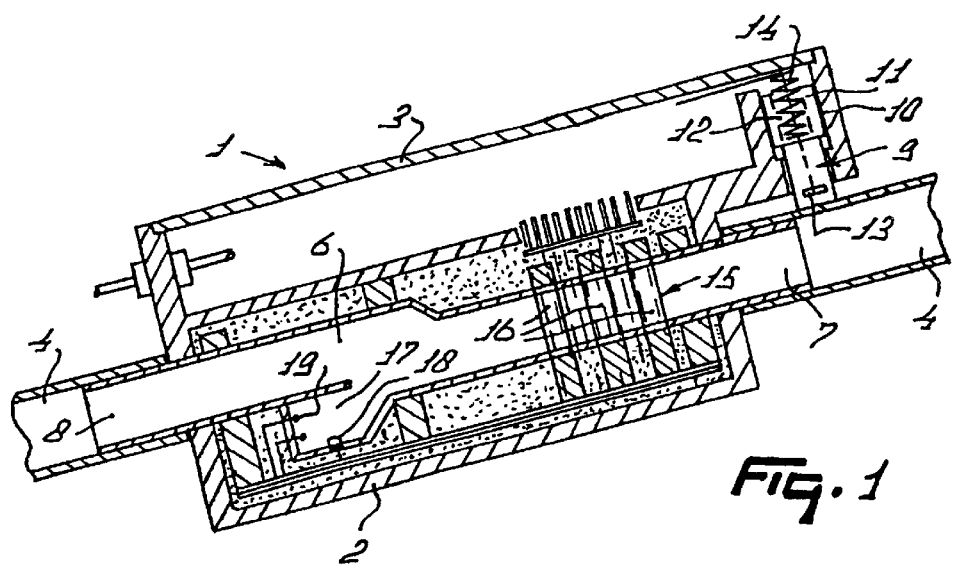
FIG. 1 is a cross-sectional view of a milk line with various sensors included therein for measuring, inter alia, the quality of the milk.
Figure 2:
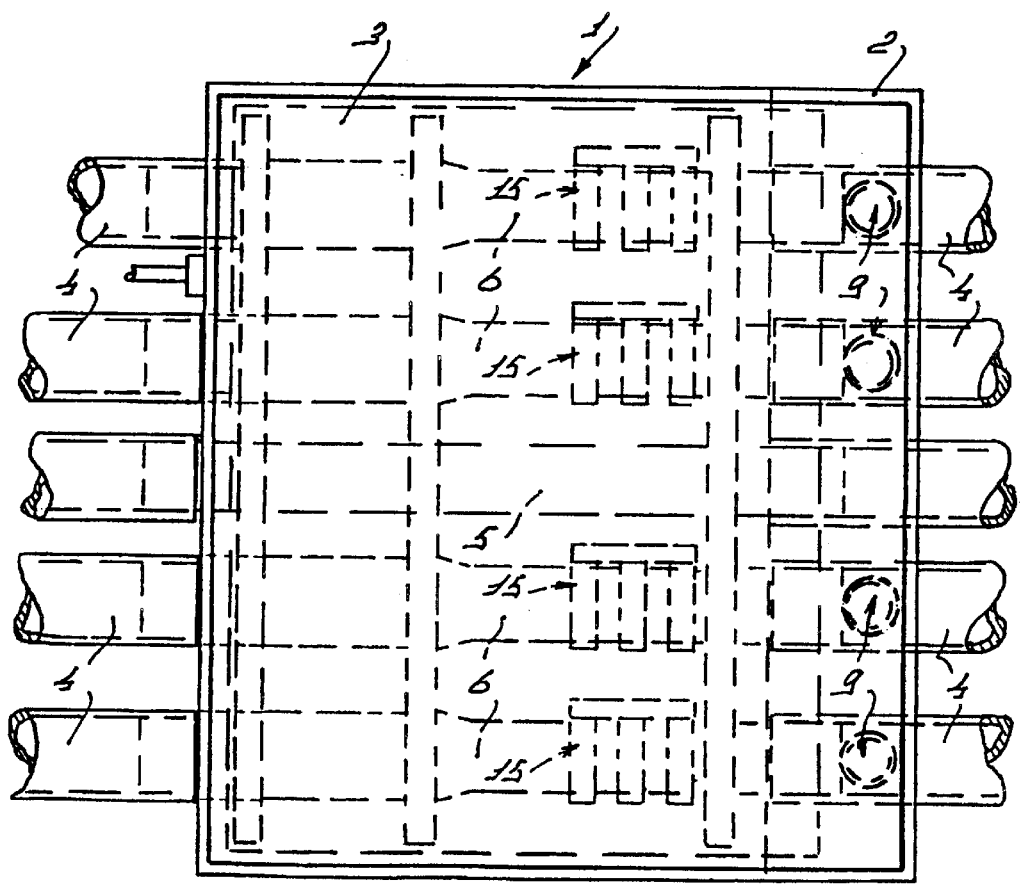
FIG. 2 is a plan view of the device depicted in FIG. 1.

FIG. 1 is a cross-section of a sensor block 1 comprising a housing 2 which is covered with a lid 3. As shown in FIG. 2, four milk lines 4 are connected to sensor block 1 with a pulse line 5 disposed in between. Each milk line 4 comprises a measuring tube 6 which is provided with an inflow opening 7 and an outflow opening 8. Measuring tubes 6 and pulse line 5 are embedded in housing 2. Near each inflow opening 7 an acoustic measuring mean 9 is disposed with the aid of which it can be ascertained, inter alia, whether milk is flowing through milk line 4 or whether a teat cup connected to milk line 4 and coupled to or uncoupled from a teat of an animal to be milked is, in fact, coupled or uncoupled. Acoustic measuring means 9 are disposed in bores 10 of housing 2. In each bore 10 are disposed oval, foam plastic caps 11, each provided with a bore 12 having a mini-microphone 13 disposed therein. Each mini-microphone 13 is urged against the lower side of its corresponding bore 12 by means of a compression spring 14. Thus, foam plastic caps 11 are also urged against milk lines 4 under spring pressure. Further included in measuring tube 6 is a milk conductivity sensor 15. Each milk conductivity sensor 15 comprises three spaced apart measuring rings 16. Acoustic measuring means 9 or milk conductivity sensor 15, or both, constitute first measuring means for establishing the pulsating current of the milk.

Measuring tube 6 is further provided with a measuring chamber 17 in which milk remains after a pulse flow of milk has moved through measuring tube 6. A color sensor 18 is disposed in each measuring chamber 17 by means of which the milk can be analyzed for color. Further provided in each measuring chamber 17 is a second milk conductivity sensor 19 by means of which the absolute conductivity of the milk therein can be established. Color sensor 18 or the second milk conductivity sensor 19, or both, constitute the second measuring means with the aid of which at least one parameter of the milk can be determined. For the purpose of carrying out a proper measurement in measuring chamber 17, sensor block 1 is arranged at an angle of approximately 40° relative to the horizontal. During milking, each first measuring means 9 and 15 supplies a signal indicating that a pulse flow of milk is entering the corresponding measuring tube 6, on the basis of which signal the measured values being determined at that moment by second measuring means 18 and 19 are recorded as usable measurement data or used for a further process.

Figure 3:
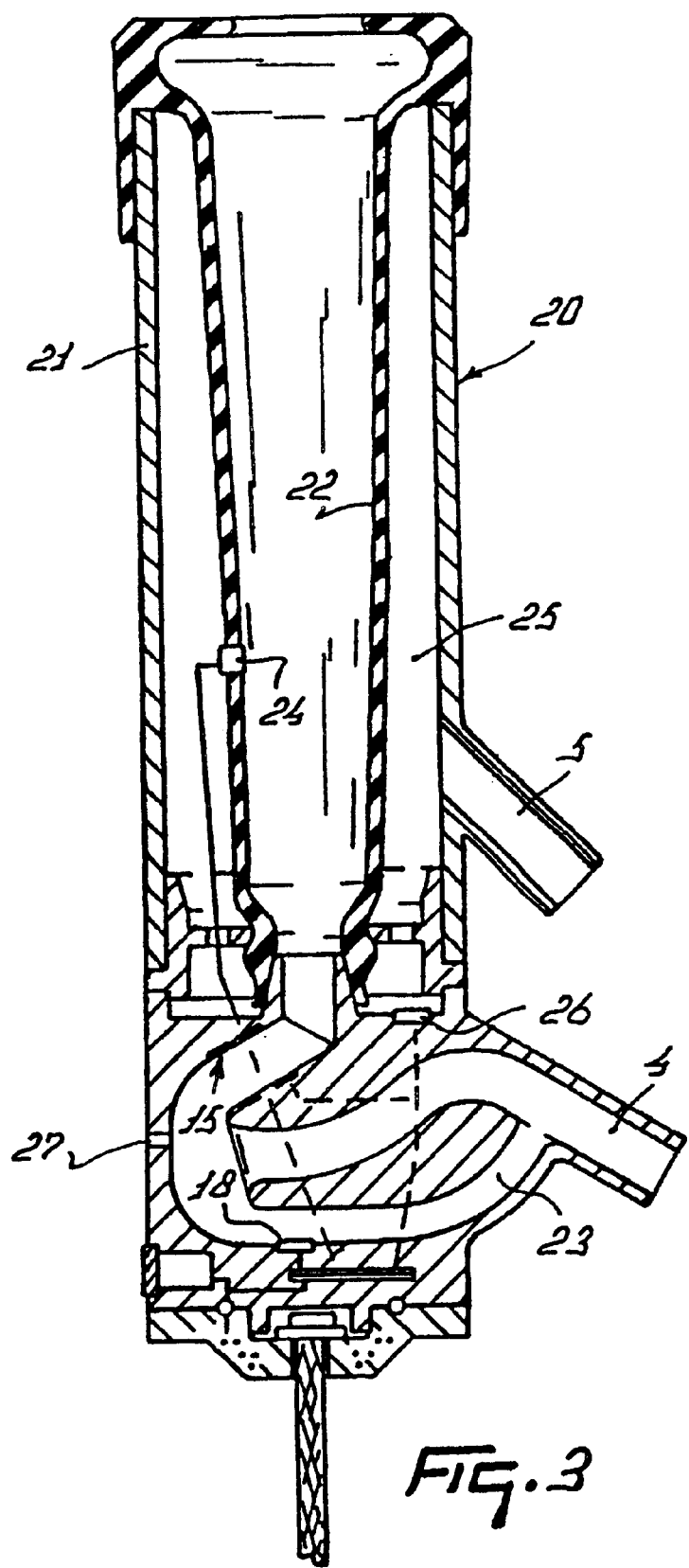
FIG. 3 is an elevational cross-section view of a teat cup which is provided with a bypass that is connected to the milk line.

FIG. 3 shows a second embodiment of the invention, in which it is also possible to obtain measurement data with a high degree of reliability. FIG. 3 shows a cross-section of a teat cup 20 comprising a cylindrical outer jacket 21 with a teat cup liner 22 included therein. To cylindrical outer jacket 21 is connected a pulse line 5. Further disposed near the lower side of outer jacket 21 is milk line 4. Said milk line 4 is provided with a bypass 23. The diameter of bypass 23 is smaller than that of milk line 4. Disposed on teat cup liner 22 is a movement sensor 24 by means of which the movements of teat cup liner 22 are registered during milking. Further disposed near the lower side of teat cup liner 22 in pulsation space 25 is a vacuum sensor 26 by means of which the alternating vacuum in pulsation space 25 can be determined during milking. A conductivity sensor 15 is located proximate the lower side of teat cup liner 22 in the milk line 4 which corresponds to the milk conductivity sensor 15 of the first embodiment. Movement sensor 24, vacuum sensor 26 and milk conductivity sensor 15 constitute the first measuring means with the aid of which the pulsating current of the milk is established. Second measuring means are disposed in bypass 23 with the aid of which at least one parameter of the milk can be determined. In the present embodiment the second measuring means comprise a color sensor 18 as disclosed in the first embodiment. However in both the first and the second embodiments, second measuring means may also be constituted by different sensors than a color sensor.

The functioning of the second embodiment is as follows. When the first measuring means ascertain that a pulse flow of milk from the teat enters milk line 4, the signal is immediately passed to the second measuring means, whereupon the second measuring means stores the data being measured at that moment or uses them as a parameter in a further process. Subsequently the pulsating current of the milk causes milk to flow through milk line 4 as well as through bypass 23, so that the milk in bypass 23 is replaced. As a result of the fact that the diameter of the bypass 23 is smaller than that of milk line 4, the rate of flow of the milk in bypass 23 is lower than that in milk line 4, so that the milk flow in the vicinity of the second measuring means is stabilized more quickly. This enables measurements to be carried out at a high degree of reliability.

In bypass 23 is an air inlet means 27 which communicates with the atmosphere. In the present embodiment air inlet means 27 are constituted by a bore.

Although I have disclosed the preferred embodiments of my invention, it is to be understood that it is capable of other adaptations and modifications within the scope of the following claims:

What is claimed is:

1. A method of making measurements of a selected characteristic of a fluid which is flowing in pulsations through a conduit, the method comprising the steps of:
   determining an optimal measuring window for said selected characteristic of said fluid for at least one pulse of said fluid;
   measuring said selected characteristic while said fluid pulse is in said optimal measuring window;
   receiving data of said selected characteristic which is measured in said optimal measuring window;
   recording or using said data in a further process; and
   flowing said fluid through said conduit independently of said measuring and before, during and after measuring said selected characteristic.

2. A method in accordance with claim 1, wherein said measuring window is defined as a time interval between when a first pulse of said pulse flow has entered a measuring region and just before a second pulse of said pulse flow enters said measuring region, momentary measurement data of said selected characteristic being made of fluid in said first pulse, said data being recorded or used in said further process.

3. A method in accordance with claim 1, wherein said conduit includes a measuring region, said measuring window being determined by a time interval which occurs when the substantially largest possible amount of said fluid from said fluid pulse is present in said measuring region.

4. A method in accordance with claim 1, wherein said measuring window is determined by the electrical conductivity of said fluid.

5. A method in accordance with claim 1, wherein said measuring window is determined by optical detection of said fluid in said conduit.

6. A method in accordance with claim 1, wherein said measuring window is determined by acoustic detection of said fluid in said conduit.

7. A method in accordance with claim 1, wherein said measuring window is defined by said pulsations.

8. A method in accordance with claim 1, wherein said pulsations are provided by a pulsator and said measuring window is determined by a signal of a series of signals from said pulsator, said series of signals comprising a pulsating flow frequency.

9. A device for making measurements of a selected characteristic of a fluid that is flowing in pulsations through a conduit, the device comprising:
   a measuring region in said conduit;
   a first sensor in said measuring region for sensing said selected characteristic; and
   a second sensor positioned in said conduit and upstream of said measuring region for determining a measuring window related to said measuring region, said measuring window comprising a time interval for measuring said selected characteristic while one of said pulsations of said fluid is in said measuring region.

10. A device in accordance with claim 9, wherein said second sensor comprises at least one of a group of sensors consisting of an optical sensor, an acoustic sensor, and an electrical conductivity sensor.

11. A device in accordance with claim 9, further comprising a pulsator which provides said pulsations in said fluid.

12. A device in accordance with claim 9, wherein said first sensor comprises a color sensor and said selected characteristic comprises color of said fluid which is sensed by said color sensor.

13. A device in accordance with claim 9, wherein said measuring region comprises a measuring chamber in which at least part of said one pulsation of said fluid is received and remains temporarily.

14. A device in accordance with claim 9, wherein said conduit comprises a main passageway and a bypass passageway.

15. A device in accordance with claim 9, wherein said fluid is composed of milk, said device further comprising a pulsator providing that said milk flows in said conduit in pulsations, said time interval not being greater than a time period between said pulsations provided by said pulsator.

16. A device in accordance with claim 15, further comprising a teat cup, said second sensor being located in said teat cup.

17. A device in accordance with claim 9, wherein said conduit comprises an inlet where said fluid is received and an outlet where said fluid is discharged, said measuring region comprising a chamber having an open end and an opposite closed end facing said inlet and said outlet of said conduit, respectively.

18. A device in accordance with claim 17, wherein said conduit is inclined at about 40° with respect to the horizontal.

19. A method in accordance with claim 1, wherein said fluid is received at an inlet end of said conduit, flows through said conduit, and is discharged at an opposite outlet end of said conduit, and said fluid of said fluid pulse is returned, after said measuring, to said conduit at a location upstream of said outlet end to be discharged via said outlet end.

20. A method in accordance with claim 19, wherein said fluid is the milk directly received from a teat of an animal being milked.

21. A device for making measurements of a selected characteristic of a fluid that is flowing in pulsations through a conduit, the device comprising:
   a measuring region in said conduit;
   a sensor in said measuring region for sensing said selected characteristic; and
   a measuring window related to said measuring region, said measuring window comprising a time interval for measuring said selected characteristic while one of said pulsations of said fluid is in said measuring region; wherein said conduit comprises a main passageway and a bypass passageway; and
   the diameter of said bypass passageway is smaller than the diameter of said main passageway, said measuring region being situated in said bypass passageway.

22. A device for making measurements of a selected characteristic of a fluid that is flowing in pulsations through a conduit, the device comprising:
   a measuring region in said conduit;
   a sensor in said measuring region for sensing said selected characteristic; and
   a measuring window related to said measuring region, said measuring window comprising a time interval for measuring said selected characteristic while one of said pulsations of said fluid is in said measuring region; wherein said conduit comprises a main passageway and a bypass passageway; and
   said fluid is a liquid, an inlet being provided for admitting a gas into said bypass passageway.

23. A device for making measurements of the characteristics of a fluid that is flowing in pulsations through a conduit, the device comprising a measuring region in said conduit for making measurements of a selected characteristic of a fluid which is flowing in pulsations in said conduit, a sensor in said measuring region for sensing said selected characteristic, and a measuring window related to said measuring region which comprises a time interval for measuring said selected characteristic while said pulsation of said fluid is in said measuring region, said fluid being composed of milk and the device further comprising a pulsator providing that said milk flows in said conduit in pulsations, said time interval not being greater than the time period between said pulsations provided by said pulsator, the device further comprising a teat cup, said sensor being located in said teat cup.

24. A method in accordance with claim 1, wherein said measuring window is determined when first pulse of said pulse flow of said fluid has passed a measuring region and a second pulse of said pulse flow is about to enter said measuring region.

* * * * *